June 14, 1966  R. C. DIMMICH ETAL  3,255,938
SPIGOT FOR REFRIGERATED CONFECTION
Filed Aug. 10, 1964  2 Sheets-Sheet 1

INVENTORS.
ROBERT C. DIMMICH and
BY ROBERT M. MANKER

*Lockwood, Woodard, Smith & Weikert*
Attorneys

June 14, 1966 R. C. DIMMICH ETAL 3,255,938
SPIGOT FOR REFRIGERATED CONFECTION
Filed Aug. 10, 1964 2 Sheets-Sheet 2

INVENTORS.
ROBERT C. DIMMICH and
ROBERT M. MANKER
BY
Lockwood, Woodard, Smith & Weikart
Attorneys

United States Patent Office 3,255,938
Patented June 14, 1966

3,255,938
SPIGOT FOR REFRIGERATED CONFECTION
Robert C. Dimmich and Robert M. Manker, Indianapolis, Ind., assignors to General Equipment Mfg. & Sales, Inc., Indianapolis, Ind., a corporation of Indiana
Filed Aug. 10, 1964, Ser. No. 388,591
3 Claims. (Cl. 222—505)

This invention relates generally to spigots for delivery of relatively viscous fluids and in particular to a spigot for use with soft serve ice cream machines or the like.

Frozen mix machines are coming into widespread use in high volume, restaurant drive-in installations for the rapid drawing and serving of frozen and semi-frozen, relatively viscous fluids such as soft serve ice cream. An example of the general type of machine referred to is disclosed in U.S. Patent 3,013,398. In general, in such installations the spigot protrudes from the front of a refrigerated enclosure or mixing chamber. When the spigot is opened, the viscous mixture is extruded or forced through the spigot by the agitator or other pumping device within the mixing chamber. Since the mouth of the spigot is, of necessity, spaced outwardly an appreciable distance from the insolated front wall of the refrigerated mixing chamber, closing of the spigot, in prior art constructions, leaves a slug of the semi-frozen liquid in the spigot tube and outside of the insulated and refrigerated mixing chamber. Even a short delay until the next operation of the spigot permits this slug in the uninsulated spigot to melt. At the next withdrawal, this melted, and therefore thin, slug of liquid runs into the cup immediately upon opening of the spigot. The texture, homogeneity and appearance of the mixture portion withdrawn is adversely affected.

It is an object of the present invention to provide a spigot adapted for use as referred to above in which the portion of the spigot extending outside the refrigerated chamber is cleared of the fluid dispensed by the spigot each time the spigot is closed.

A further object of the present invention is to provide a spigot of the type referred to which can be easily and conveniently disassembled for cleaning.

A further object of the present invention is to provide a spigot of the type referred to which is held or locked in closed position by an over-center positioning of the actuating linkage, preventing accidental opening due to product pressure and also making the spigot reliable for use on mobile units which are subject to jarring and vibration.

A further object is to provide a spigot of the type referred to which provides a mechanical advantage to assist the operator in closing the spigot against the relatively high product pressure developed by the agitator or other pumping device; this relatively high product pressure that is, pressure within the insulated chamber of the machine, being characteristic of soft serve ice cream machines.

These and other objects will become apparent as the description proceeds with reference to the accompanying drawings in which.

Figure 1:
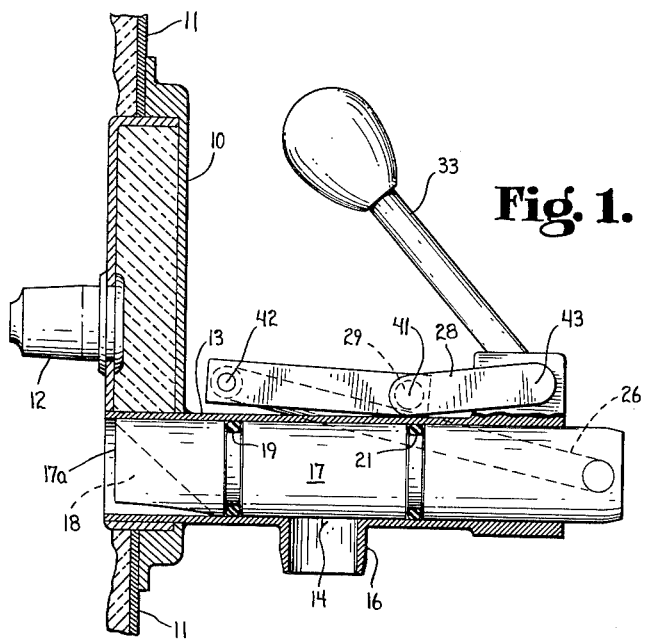
FIG. 1 is a side sectional view of a spigot embodying the present invention and mounted on the insulated front panel (a fragment only being illustrated) of a frozen mix machine.

Referring to the drawings, reference numeral 10 indicates a portion or hatch secured to the insulated front wall 11 of a thermally insulated enclosure housing the semi-fluid mix and forming one of the primary components of the soft service ice cream machine itself. Only a fragment of the insulated wall 11 of the machine is shown herein since the machine itself forms no part of the present invention. The hatch 10 carries a stub shaft 12 which extends into the insulated chamber or enclosure and serves to support an agitator shaft, not shown.

Adjacent its lower margin the hatch 10 is apertured to receive the spigot tube 13, the interior of the spigot tube communicating with the interior of the insulated enclosure, that is, the area on the left hand side of the insulated wall 11 as viewed in FIG. 1. The tube 13 is provided with an aperture 14 in its side wall, the tube side wall being flanged as indicated at 16 to provide a nozzle defining the aperture 14. The aperture 14 and the encircling flange 16 provide a mouth through which fluid may be delivered from the spigot tube.

Slidably received within the tube 13 is a piston 17. It will be noted that the piston has an axial length somewhat greater than the length of the tube 13 and that when the tube is in closed position as shown in FIG. 1, that is, a position wherein the piston occupies substantially all of the interior of the tube and thereby obstructs the delivery aperture 14, the piston protrudes somewhat from the end of tube remote from the hatch 10.

Figure 2:
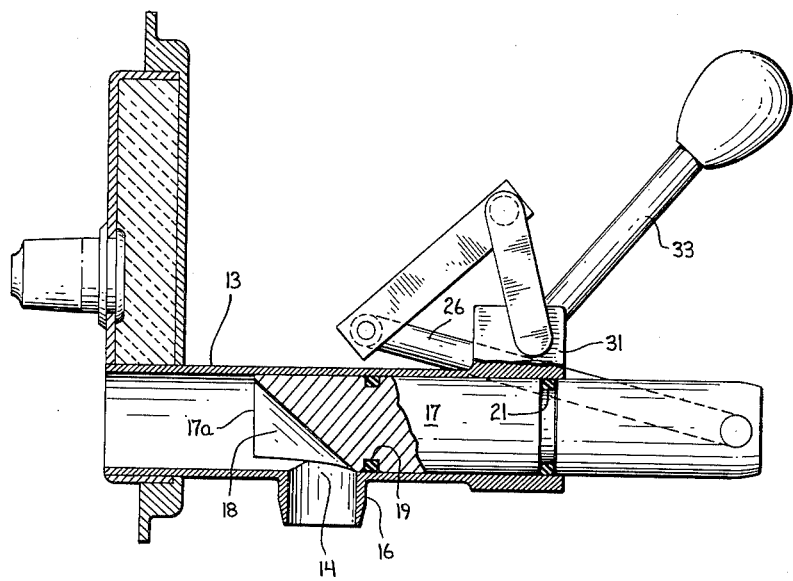
FIG. 2 is a side sectional view similar to FIG. 1 but showing the spigot in open position.

The piston is provided with a diagonal undercut or notch 18 which, as will be evident from FIG. 2, permits the aperture 14 to be opened or cleared without necessitating the withdrawal of the piston from the tube to the degree necessary to displace the end of the piston 17a outwardly beyond the aperture 14. The notch 18 could be omitted without changing the mode of operation of the spigot, such omission merely requiring a more extreme withdrawal of the piston from the tube. The piston 17 is grooved to accommodate two spaced dynamic seals taking the form of the O-rings 19 and 21. As will be evident from FIG. 1 the O-rings 19 and 21 are spaced on the piston so as to bracket the discharge aperture 14. When the piston is withdrawn from the tube to place it in open position as shown in FIG. 2, the O-ring 21 remains in sealing engagement with the tube.

Figure 3:
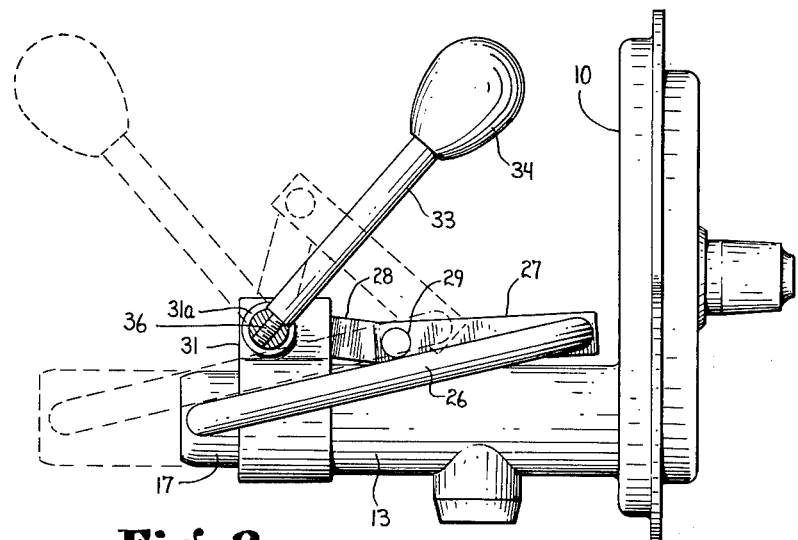
FIG. 3 is a side plan view of the spigot, with the spigot shown in closed position in solid lines and in open position by broken lines.
Figure 4:
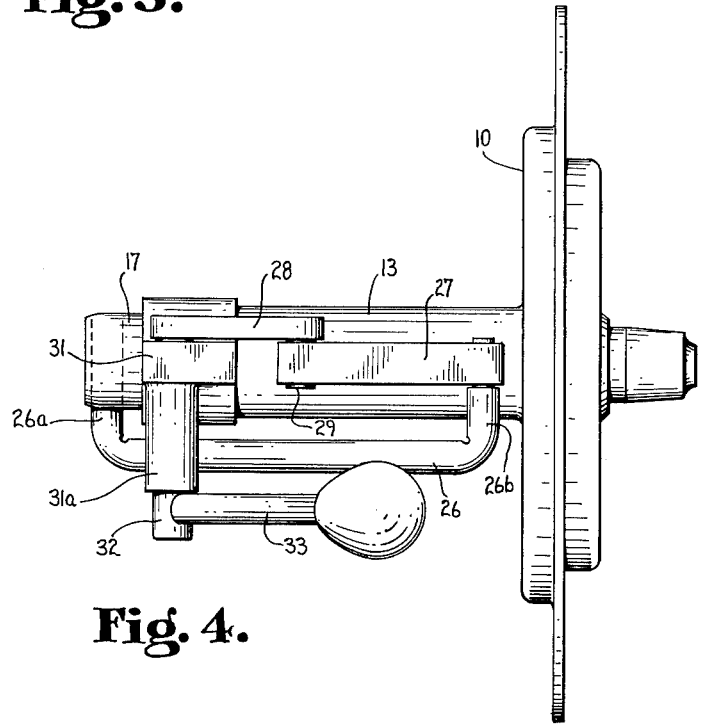
FIG. 4 is a top plan view of the spigot, shown in closed position.

The manually operable means for moving the piston between its open position shown in FIG. 2 and its closed position shown in FIG. 1 includes an arm 26 extending from the outer end portion of the piston. As may best be seen in FIG. 4 the arm 26 at one end has a sidewardly extending portion 26a which is received within an aperture in the end portion of the piston 17. At its opposite end the arm 26 has a sidewardly extending portion 26b whose reduced end extends freely into an accommodating aperture in the end of a first toggle link 27. As will be particularly evident from FIGS. 3 and 4 the shank of the arm 26 extends adjacent to and exteriorly of the tube 13. A second motion transmitting toggle link 28 is pivotally connected to the link 27 by means of the pin 29. As illustrated in FIG. 4 the pin 29 is integral with or rigidly attached to the link 28 and extends freely through an accommodating aperture in the end of the link 27. It will be understood that this pivotal connection might take other forms, however, the arrangement here illustrated provides convenience in disassembling the apparatus as will be subsequently described.

The opposite end of the link 28 is pivotally connected to a flange 31 which extends upwardly from and is integrally with the tube 13. The pivotal connection for the link 28 with the flange 31 is provided by the extension of a pin 32, rigidly attached to the end of the link 28, which extends freely through an accommodating aperture in the flange 31 and the sidewardly extending sleeve 31a which is rigidly attached to or integral with the flange 31. A handle 33, having a grasp-knob 34 is threaded into the extending end portion of the pin 32 as indicated at 36 in FIG. 3.

The assembly may be easily and conveniently disassembled for cleaning by removing the handle 33 from the pin 32. The link 28 and the pin 32 carried by the link may then be removed from the sleeve 31a, the pin 29, also carried by the link 28 will simultaneously be withdrawn from the aperture in the link 27. The link 27 may then be removed from the reduced end of the arm 26. The piston 17 may then be rotated through approximately 90° from its position of FIG. 4 so that the end 26b of the arm 26 clears the sidewardly extending sleeve 31a and the piston may then be completely withdrawn from the sleeve. Reassembly of the piston and sleeve and motion transmitting linkage may be accomplished by reversing the disassembly procedure.

In operation, with the spigot in closed position as viewed in FIG. 1, the handle 33 may be moved clockwise as viewed in FIG. 1 in a plane parallel to the axis of the tube. As the handle is so moved the linkage will be displaced to its position of FIG. 2 and the piston will be moved partially out of the tube so as to clear the aperture 14 permitting discharge of the semi-liquid mix. When the spigot is moved to closed position, by movement of the handle 33 in a counterclockwise direction as viewed in FIG. 2, the piston will be advanced from its position of FIG. 2 into its position of FIG. 1 and when it is so advanced any mix in front of the end 17a of the piston will be ejected from the tube and into the enclosure, that is, into the insulated area leftwardly of the hatch 10 as viewed in FIGS. 1 and 2.

Referring particularly to FIG. 1 it will be noted that when the piston and the actuating linkage are in closed position, the pivotal axis 41 of the joined ends of the links 27 and 28 lies below a line joining the axis of pivotal motion 42 and 43 for the links 27 and 28, respectively. Soft serve ice cream machines characteristically generate a relatively large pressure, referred to as product pressure, within the insulated chamber of the machine. The overcenter arrangement thus achieved serves to lock or retain the handle in its closed position and hence serves to prevent movement of the handle and the piston to open position under the force of product pressure or by jarring or vibration particularly as might occur with a mobile mounted soft serve ice cream machine.

It should be noted that if the O-ring seal 21 were omitted and only the seal 19 provided, as the surface of the piston to the right of the O-ring 19 moved back and forth across the inner surface of the tube adjacent the aperture 14 in opening and closing the spigot, some of the fluid would adhere to the piston surface and would be pumped or forced out of the open end of the sleeve 13 adjacent the flange 31. The presence of the O-ring 21 prevents any pumping or oozing of fluid out the end of the spigot. It should further be noted that in moving the piston 17 between open and closed positions the hand motion required to actuate the handle 33 is reciprocating in a plane parallel to the axis of motion of the piston. This direction and type of manual actuation is identical to that required on many soda-fountain devices and the manual coordination required to operate the spigot can be easily acquired by unskilled personnel.

It should also be noted that the linkage and length of handle 33 provide a mechanical advantage permitting the spigot to be closed with ease even against the relatively high product pressure against which the piston 17 must move.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A spigot assembly for delivery of a semi-liquid fluid from an insulated enclosure comprising a tube extending exteriorly of the enclosure but communicating with the interior thereof, an aperture in the side wall of the tube intermediate its ends and providing a mouth through which fluid is delivered, a piston slidably received within said tube and having an axial length at least equal to the length of the tube, said piston being movable within the tube between a closed position wherein said piston occupies substantially all of the interior of said tube and thereby obstructs said delivery aperture and an open position wherein said piston is partially withdrawn from said tube to clear the portion of the tube between said delivery aperture and the enclosure, and manually operable means for moving said piston between its open and closed positions, movement of said piston from open to closed position thereby ejecting from said tube and into said enclosure the fluid accommodated within said tube portion when said piston is in open position, said manually operable means including a U-shaped arm having the end portion of one of its legs received within an aperture in the outer end of said piston, the end portion of its other leg being received within an aperture in one end of a first motion transmitting toggle link, a second motion transmitting toggle link having a pin extending transversely from one of its ends, a flange extending from said tube having an aperture receiving said pin with said pin extending through and beyond said flange, said links being pivotally joined at their free ends, and a handle extending radially from the portion of said pin beyond said flange, rotation of said pin by movement of said handle pivotally moving said links and thereby moving said arm and piston between said open and closed positions, the joined ends of said links being stopped on said tube so that the axis of pivotal motion of the joined ends of said links is below a line joining the axes of pivotal motion of the opposite ends of said links when said piston is in its said closed position thereby locking said piston against movement by fluid pressure within the tube.

2. A spigot assembly for delivery of a semi-liquid fluid comprising a tube, said tube having an intake end and an aperture in the side wall of the tube intermediate its ends providing a mouth through which fluid is delivered, a piston slidably received within said tube, said piston being movable within the tube between a closed position wherein said piston occupies substantially all of the interior of said tube between its said intake end and said delivery aperture and thereby obstructs said aperture and an open position wherein said piston is partially withdrawn from said tube to clear the portion of the tube between said delivery apertuer and said intake end, and manually operable means for moving said piston between its open and closed positions, movement of said piston from open to closed position thereby ejecting from said tube the fluid accommodated within said tube portion when said piston is in open position, said manually operable means including a U-shaped arm having the end portion of one of its legs received within an aperture in the outer end of said piston, a first motion transmitting toggle link having an aperture receiving the end portion of the other leg of said U-shaped arm, a second motion transmitting toggle link pivotally supported at one of its ends on said tube, said links being pivotally joined at their free ends, handle means for pivotally moving said second link, to shift said arm and piston between said open and closed positions, the joined ends of said links being stopped on said tube so that the axis of pivotal motion of the joined ends of said links is below a line joining the axes of pivotal motion of the opposite ends of said links when said piston is in its said closed position.

3 A manually operable valve assembly comprising a tube having a discharge aperture in its side, a member movable within the tube between an open position wherein the discharge aperture is unobstructed and a closed position in which the discharge aperture is obstructed, and a readily disassembled linkage for moving said member between its positions, said linkage comprising a generally U-shaped arm having one leg freely received within an aperture in said member, the other leg extending freely into an aperture in a first toggle link, a second toggle link having an elongated pin extending transversely from one of its ends and a second pin extending transversely from its other end parallel to the elongated pin, said second pin being freely accommodated in an aperture in said first toggle link, a sleeve carried by said tube transverse to the tube axis, said elongated pin carried by the second toggle link extending through and beyond said sleeve, and a handle member removably accommodated by the portion of said elongated pin extending beyond said sleeve, whereby with said handle member in place said elongated pin is locked against withdrawal from said sleeve and said linkage is held in assembled relation and when said handle member is removed from said elongated pin said first and second toggle links and said arm may be separated from each other and from said valve member.

References Cited by the Examiner

UNITED STATES PATENTS

| | | | |
|---|---|---|---|
| 376,254 | 1/1888 | Nye | 222—509 X |
| 872,536 | 12/1907 | Nystrom | 222—509 X |
| 2,001,040 | 5/1935 | Sweeney | 222—509 X |
| 2,030,510 | 2/1936 | Griffiths. | |
| 2,035,213 | 3/1936 | Anderson | 222—509 X |
| 2,264,671 | 12/1941 | Kocher | 222—509 X |

FOREIGN PATENTS 1,218,111  12/1959  France.

LOUIS J. DEMBO, *Primary Examiner.*